United States Patent
Ando

[11] Patent Number: 6,068,411
[45] Date of Patent: May 30, 2000

[54] DISTORTION CHARACTERISTIC AND YIELD OF SEMICONDUCTOR LASER MODULE

[75] Inventor: Haruyasu Ando, Tokyo, Japan

[73] Assignee: NEC Corporation, Tokyo, Japan

[21] Appl. No.: 09/093,340

[22] Filed: Jun. 9, 1998

[30] Foreign Application Priority Data

Jun. 10, 1997 [JP] Japan ................................ 9-152445

[51] Int. Cl.[7] ........................................................ G02B 6/36
[52] U.S. Cl. ............................... 385/88; 385/89; 385/90; 385/91; 385/94
[58] Field of Search ................................ 385/88, 89, 90, 385/91, 94, 37, 14; 372/36, 109, 43

[56] References Cited

U.S. PATENT DOCUMENTS

| | | | |
|---|---|---|---|
| 5,012,475 | 4/1991 | Campbell | 372/29 |
| 5,034,334 | 7/1991 | Flynn et al. | 437/8 |
| 5,774,616 | 6/1998 | Matsuda | 385/89 |
| 5,930,430 | 7/1999 | Pan et al. | 385/94 |
| 5,948,084 | 9/1999 | Ha | 710/73 |
| 5,974,065 | 10/1999 | Kanda | 372/43 |
| 5,995,525 | 11/1999 | Kosugo | 372/36 |

FOREIGN PATENT DOCUMENTS

| | | |
|---|---|---|
| 2-37790 | 2/1990 | Japan . |
| 3-30383 | 2/1991 | Japan . |
| 4-253386 | 9/1992 | Japan . |
| 4-350981 | 12/1992 | Japan . |

*Primary Examiner*—Cassandra Spyrou
*Assistant Examiner*—Mohammad Y. Sikder
*Attorney, Agent, or Firm*—McGinn & Gibb, P.C.

[57] ABSTRACT

A semiconductor laser module of the present invention comprises a semiconductor laser, a pig tail optical fiber, a optical part, and a transition metal doped optical fiber. The optical part optically couples the semiconductor laser and the pig tail optical fiber to each other. The transition metal doped optical fiber is formed in a length corresponding to an attenuation amount with which desired distortion characteristics and desired noise characteristics are realized, and is connected to the side of the pig tail optical fiber opposite to the side which faces the semiconductor laser. The distortion characteristics of the semiconductor laser is improved by the action of the transition metal doped optical fiber. Consequently, the yield of semiconductor laser modules is improved.

16 Claims, 4 Drawing Sheets

DISTORTION CHARACTERISTIC AND YIELD OF SEMICONDUCTOR LASER MODULE

BACKGROUND OF THE INVENTION

1. Field of the Invention

This invention relates to a semiconductor laser module for use as a light source and a method for producing the same.

2. Description of the Related Art

As the number of channels of a cable television service increases, increasing attention is given to optical CATV (Community Antenna Television cable TV). In some communications, such as an optical CATV, a subcarrier multiplex (SCM) optical transmission system is adopted. The subcarrier multiplex optical transmission system is a communication system wherein a plurality of modulation signals frequency multiplexed in a radio frequency band are directly light intensity modulated and transmitted. The subcarrier multiplex optical transmission system is used, for example, for transmission of a multi-channel video signal of a CATV or a radio carrier of mobile communication.

Such a subcarrier multiplex optical communication system is required to have low distortion and low noise. It is demanded to use a semiconductor laser module having low distortion/noise characteristics different from those of a semiconductor laser which is used in an ordinary communication system for digital signals. The distortion/noise characteristics of a semiconductor laser module normally vary depending upon the bias current to be supplied to the semiconductor laser.

FIG. 1 illustrates a relationship of the bias current to the distortion characteristic and the fiber light output of a semiconductor laser. Referring to FIG. 1, a curve 11 indicates a relationship between the bias current and the distortion of the semiconductor laser, and another curve 12 indicates a relationship between the bias current and the fiber light output of the semiconductor laser. The distortion characteristic indicated in FIG. 1 is represented by an intermodulation second order distortion (IMD2) by a 2-tone method. The 2-tone method is a method wherein, in order to measure non-linear components, two different frequencies (f1, f2) are inputted simultaneously to a semiconductor laser and an intermodulation distortion produced by the semiconductor laser is measured.

As second and third order intermodulation distortions, distortions are produced in the following frequencies:
Second order intermodulation distortion: f1±f2
Third order intermodulation distortion: 2×f1±f2, 2×f2±f1

As can be seen from the curve 11, if the bias current of the semiconductor laser is increased, then the distortion characteristic is improved as the bias current increases until it reaches to a certain current value I1. Then, as the bias current increases over this current value I1, the distortion increases and the distortion characteristic is deteriorated. On the other hand, as can be seen from the curve 12, as the bias current of the semiconductor laser increases, the fiber light output increases substantially linearly where the bias current is higher than threshold level current value I2. In this manner, there is a current condition or a fiber light output condition in which the semiconductor laser module shows its best distortion characteristic.

FIG. 2 illustrates a relationship between the fiber light output and the bias current and another relationship between the noise and the bias current of the semiconductor laser. Referring to FIG. 2, a curve 13 indicates a relationship between the bias current and the noise of the semiconductor laser and a curve 14 indicates a relationship between the bias current and the fiber light output of the semiconductor laser. The noise indicated in FIG. 2 is represented by relative intensity noise (RIN). As can be seen from the curve 13, as the bias current value of the semiconductor laser increases, the RIN decreases and the RIN characteristic is improved. The fiber light output of the curve 14 is same as curve 12 of FIG. 1. Accordingly, it can be seen that, as the fiber light output increases, the RIN characteristic is improved.

Generally, when a semiconductor laser module is used in a subcarrier multiplex optical transmission system, it is demanded to set the bias current to an optimum condition in order to achieve a desired distortion characteristic. However, since specifications of an ordinary transmission system include a limitation of a transmission loss between a transmitter and a receiver, the light output of a semiconductor laser module is specified so as to satisfy the specifications.

Accordingly, a semiconductor laser module cannot always be operated in an optimum current condition with regard to the distortion characteristic. Therefore, before a semiconductor laser module is adopted for a product, it is necessary to test the semiconductor laser module to detect whether or not they satisfy the required specification for selection.

FIG. 3 shows a construction of a conventional semiconductor laser module for a subcarrier multiplex optical transmission system. This semiconductor laser module 21 includes a semiconductor laser element 22, a lens 23 for converging emitting light of the semiconductor laser element 22, an optical fiber 24, and an optical isolator 25 interposed between the optical fiber 24 and the lens 23.

Light emitted from the semiconductor laser element 22 is converged by the lens 23 and optically coupled to the optical fiber 24. As the semiconductor laser element 22, a laser diode (DFB-LD) of the distribution feedback type which has high output, low distortion and low noise characteristics and oscillates in a single longitudinal mode is used popularly. Where a distribution feedback type laser diode is used as the semiconductor laser element 22, it is liable to be influenced by reflected returning light from, for example, an end face of optical fiber 24 or a junction of an optical connector (not shown) in a transmission line in the inside of the semiconductor laser module 21. As a result, the light output characteristic or the distortion/noise characteristics are liable to become unstable. Therefore, in the semiconductor laser module which employs a distribution feedback type laser diode, an optical isolator 25 is interposed in the optical system as seen in FIG. 3 to prevent the influence of reflected returning light upon the characteristics.

Conventionally, for the semiconductor laser module 21 of the construction shown in FIG. 3, a characteristic test to detect whether or not various characteristics required by a system are satisfied is performed and products which are acceptable are selected. Principal items of such a characteristic test are a light output, distortion and noise. Of the characteristics, particularly the distortion characteristic may possibly be much different between respective semiconductor laser elements 22 and is also much varied by the state of the optical coupling system in the module. Accordingly, when assembly of semiconductor laser module 21 is completed, a test must be performed to detect whether or not the distortion characteristic finally satisfies a predetermined specification.

Further, depending upon the method of use in the subcarrier multiplex optical transmission system, it is sometimes required for semiconductor laser module 21 to satisfy predetermined distortion/noise characteristics under various light output conditions. This is because the light output of the semiconductor laser module 21 is settled by the transmission loss based on the transmission distance between the transmitter and the receiver.

As a first method for solving such a problem as just described, a method is available wherein the optical coupling between the semiconductor laser element 22 and optical fiber 24 in the semiconductor laser module 21 is optimized to form them into a module. For example, a bias current condition for obtaining an optimum distortion value of the semiconductor laser element 22 is obtained in advance, and the optical coupling between the light output of the semiconductor laser element 22 itself and the optical fiber 24 under the bias current condition to form them into a module. In order to optimize the optical coupling, it is a common method to displace the relative positions of the each parts from their optimum positions to add an excessive loss.

FIG. 4 shows a semiconductor laser module which employs a second method for the solution of the problem. The semiconductor laser module 30 shown in FIG. 4 includes the optical fiber 24 of the semiconductor laser module having the same construction as that shown in FIG. 3 and an optical fixed attenuator 32 connected to the optical fiber 24 by a connecting element 31. In the semiconductor laser module 30 having this construction, an excessive loss is added by the optical fixed attenuator 32. The optical fixed attenuator 32 having a required attenuation amount is selectively secured for each semiconductor laser module 30. Further, since reflection of light occurs at connecting element 31, a connection method which achieves sufficiently low reflection must be selected in order that the characteristic of semiconductor laser module 30 may not be deteriorated by the reflected light.

FIG. 5 shows a further prior art (Japanese Patent Laid-Open No. 350981/1992 for achieving an operation with an optimum distortion characteristic. In an optical receiver 41 of a CATV optical transmission system shown in FIG. 5, an output of photodiode 42 is inputted to a signal amplifier 44 through a capacitor 43, and an output terminal of a signal amplifier 44 is connected to a band-pass filter 46. Thus, from the output signal of the signal amplifier 44, a desirable frequency is selected by the band-pass filter 46. A level detection circuit 47 is connected to the band-pass filter 46 and a discrimination circuit 48, and detects a distortion level of the frequency selected by the band-pass filter 46 and outputs a result of the detection to a discrimination circuit 48. A control signal generation circuit 49 is connected to the discrimination circuit 48 and a transmission apparatus 51 and transmits a control signal from the optical receiver 41 to an optical transmitter 52 through a signal line 53. A transmission apparatus 54 in the optical transmitter 52 is connected to the signal line 53 and a laser diode driving circuit 55. A transmission apparatus 54 controls the laser diode driving circuit 55 in accordance with the control signal from the control signal generation circuit 49 connected to the optical transmitter 52 by some transmission means, so as to minimize the distortion level of the optical receiver 41.

In the CATV optical transmission system shown in FIG. 5, the output signal from the signal amplifier 44 in the optical receiver 41 is branched, and a desirable frequency is selected by the band-pass filter 46. The level detection circuit 47 detects the level of the distortion of the selected frequency and the discrimination circuit 48 performs a discrimination based on a result of the detection. The control signal generation circuit 49 is connected to the discrimination circuit 48 and the transmission apparatus 51 and a transmits control signal from the optical receiver 41 to the optical transmitter 52 through the signal line 53.

Then, the control signal from the control signal generation circuit 49 is transmitted to the laser diode driving circuit 55 through the transmission apparatus 51 of the Optical transmitter 52. The control signal controls the laser diode driving circuit 55 so that a driving current for a laser diode 57 may be automatically set to a value with which the distortion is minimized in an arbitrary CATV optical transmission system. In this manner, the laser diode driving current can be automatically set to an optimum value. It is to be noted that, as shown in FIG. 5, the output side of an input terminal setting circuit 61 is connected to the laser diode 57 through a capacitor 62 and a resistor 63, and similarly, the driving side of the laser diode driving circuit 55 is connected to the laser diode 57 through a coil 64.

As described above, in the conventional semiconductor modules, a test for discriminating whether or not characteristics are acceptable is performed for finished products. Consequently, there is a problem in that, if the ratio of rejected products is high, it makes the production cost higher. Further, there is another problem in that, if it is tried to apply products which do not satisfy the specification as products of a different less severe specification, then a selecting operation is required, which increases the complication in production management.

Further, where a semiconductor module is required to satisfy predetermined distortion/noise characteristics under various light output conditions, it is necessary to add an optical coupling loss to the module in accordance with the required light output condition and the distortion characteristics, during the production process of the module. Therefore, a plurality of products produced in different production conditions must be prepared, and this complicates production management since one kind of product is produced in at least one lot for each production condition. In particular, since the bias condition which makes the distortion characteristic optimum is different between different semiconductor laser elements, it cannot be avoided to discriminate whether or not the distortion characteristic is satisfied in a desired light output condition by a characteristic test after the semiconductor laser module is completed, resulting in complication.

Further, with the arrangement illustrated in FIG. 4, several different optical fixed attenuators 32 must be prepared in advance taking required attenuation amounts into consideration. Therefore, there is a problem in that this results in complication in production management. This is because, since the bias condition which provides an optimum distortion characteristic is different between different semiconductor laser elements similarly as in the case of the semiconductor laser module described above, whether or not a distortion characteristic is satisfied in a desired light output condition does not become clear until after a discrimination whether or not a semiconductor laser module is acceptable is performed after completion of the semiconductor module.

It is to be noted that, in the prior art disclosed in Japanese Patent Laid-Open No. 350981/1992 and shown in FIG. 5, the bias current value of the semiconductor laser module is varied in order to improve the distortion characteristic. Consequently, as the bias current value varies, the light output level varies simultaneously, and as a result, an operation in a fixed light output condition cannot be performed any more. Therefore, the problems described above cannot be solved essentially.

SUMMARY OF THE INVENTION

It is an object of the present invention to provide a semiconductor laser module which is improved in distortion characteristic and yield of good products and a method of producing the semiconductor module.

A semiconductor laser module of the present invention comprises a semiconductor laser, a pig tail optical fiber, optical parts, and a transition metal doped optical fiber. The semiconductor laser and the pig tail optical fiber are connected to each other by the optical parts. The transition metal doped optical fiber has a length corresponding to an attenuation amount with which a desired distortion characteristic and a desired noise characteristic are realized, and is connected to the side of the pig tail optical fiber opposite to the side which faces the semiconductor laser. By this construction, the distortion characteristic of the semiconductor laser is improved and the yield of semiconductor laser modules is improved. The semiconductor laser module may further comprise an optical isolator interposed between the semiconductor laser and the pig tail optical fiber, in addition to the aforementioned construction. The optical isolator prevents light emitted from the semiconductor laser from being introduced back into the semiconductor laser as a result of reflection of the light. By this construction, reflected returning light of the semiconductor laser module is prevented. The pig tail optical fiber and the transition metal doped optical fiber may be connected to each other by a connecting element formed from a fusion splice. As an alternative, they may be connected to each other by a connecting element formed from a mechanical splice. Part or all of such connecting elements may be formed from an optical connector.

In the present invention, since the transition metal doped optical fiber is connected to the side of the pig tail optical fiber opposite to the side which opposes the semiconductor laser, even where the distortion characteristic does not satisfy the specification therefore at a predetermined light output, an optical loss can be added in accordance with a characteristic of an individual semiconductor laser module. Further, by adjusting the bias current to a value corresponding to an optimum distortion condition, the distortion characteristic can be improved and the yield of good products can be improved. Meanwhile, also when semiconductor laser modules having different light output conditions are demanded, all of those semiconductor modules can be produced in the same conditions. In particular, after the semiconductor laser modules are produced collectively in the same conditions, by performing a test for characteristics and adding optical losses to the individual semiconductor modules in accordance with the distortion characteristics of the individual semiconductor modules light output specifications required for them, the distortion characteristics can be set to optimum conditions at respective light outputs.

Further, since the transition metal doped optical fiber is connected, the light attenuation amount can be selectively set to a desirable value. Since the light attenuation amount can be adjusted by the length of the transition metal doped optical fiber, it is effective to selectively connect a transition metal doped optical fiber of a suitable length in accordance with the required attenuation amount.

In this manner, according to the present invention, it is not necessary to employ different optical coupling methods for different semiconductor laser modules or to produce many kinds of semiconductor laser modules in advance and selectively use one of the semiconductor laser modules with which a desired characteristic is obtained, and consequently, increase in efficiency in production can be achieved. Further, since the method, wherein an optical fixed attenuator is prepared in advance and used in combination with a finished semiconductor laser module, is not employed, increase in efficiency in production management can be achieved.

The above and other objects, features and advantages of the present invention will become apparent from the following description with reference to the accompanying drawings which illustrate examples of the present invention.

DETAILED DESCRIPTION OF THE PREFERRED EMBODIMENT

Figure 1:
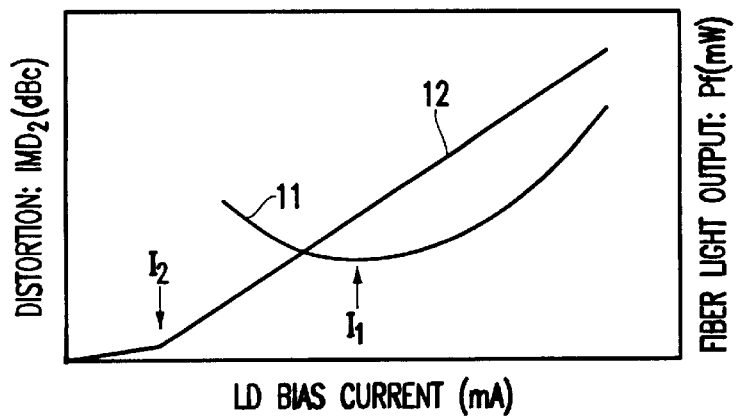
FIG. 1 is a characteristic diagram illustrating a relationship between the distortion characteristic and the bias current and a relationship between the fiber light output and the bias current of a semiconductor laser.
Figure 2:
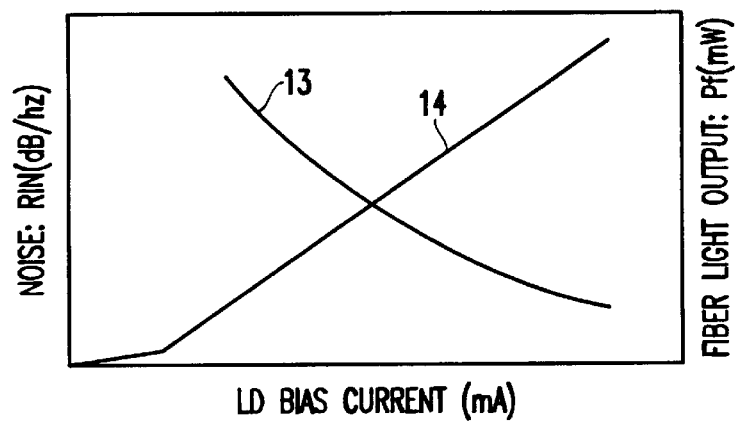
FIG. 2 is a characteristic diagram illustrating a relationship between the bias current and the noise characteristic and a relationship between the fiber light output and the bias current of a semiconductor laser.
Figure 3:
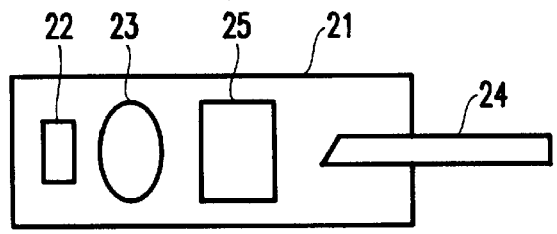
FIG. 3 is a schematic view showing a construction of a conventional semiconductor laser module for a subcarrier multiplex optical transmission system.
Figure 4:
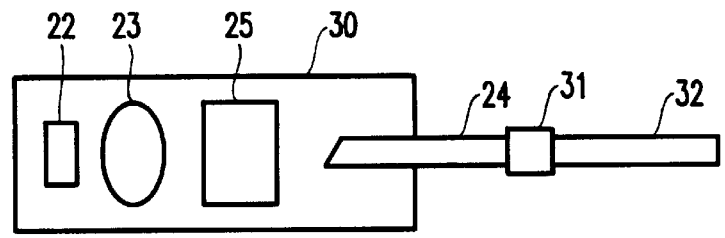
FIG. 4 is a schematic view of a semiconductor laser module to which an excess loss is added.
Figure 5:
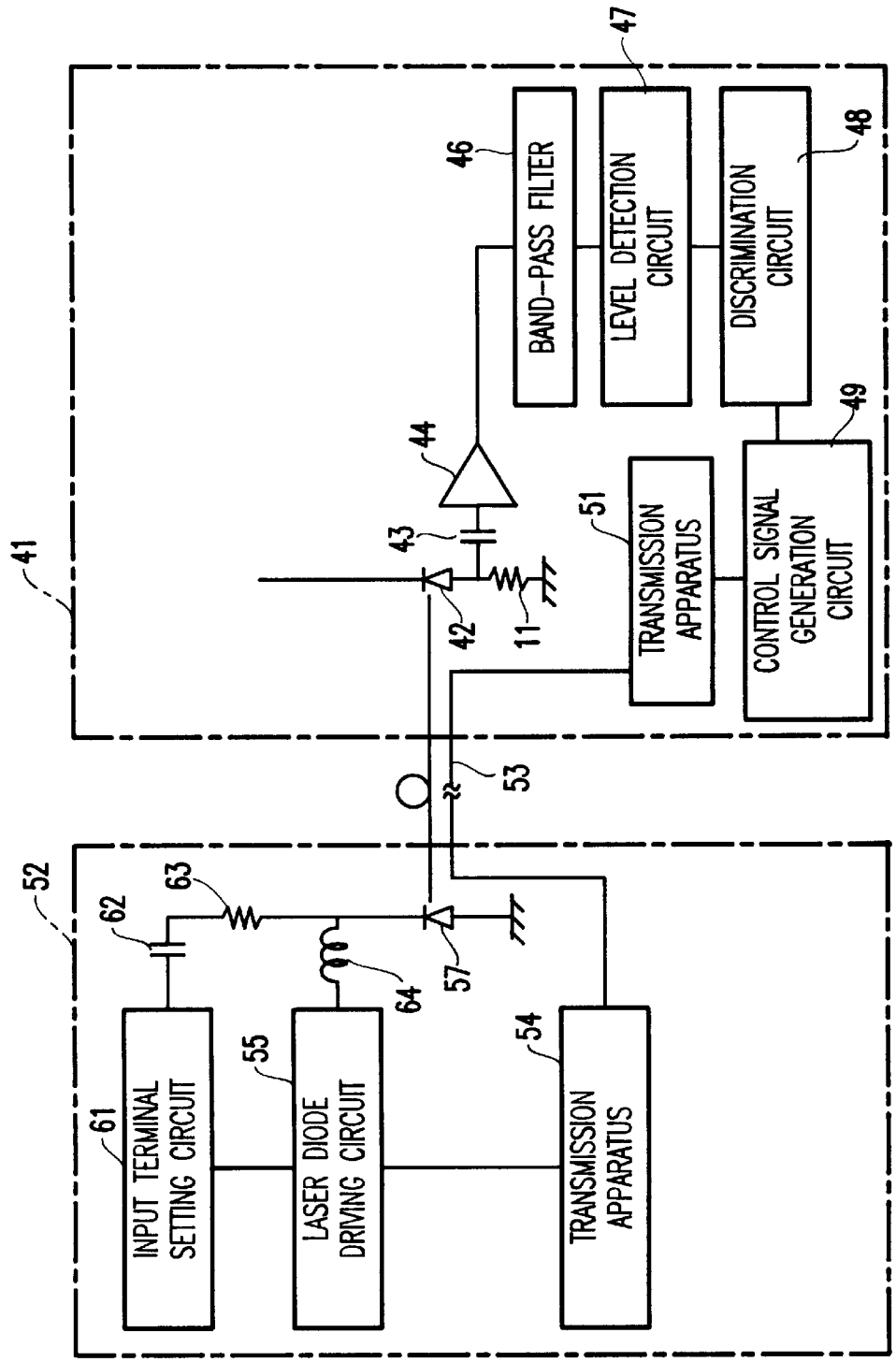
FIG. 5 is a block diagram of a conventional CATV optical transmission system.
Figure 6:
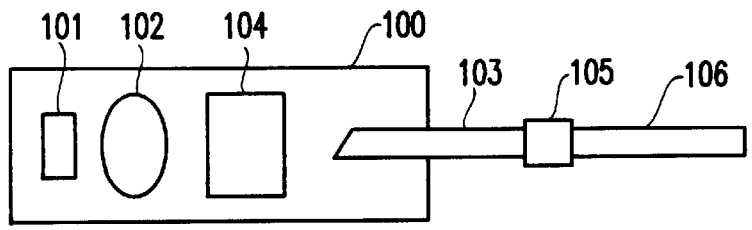
FIG. 6 is a schematic view showing a construction of a semiconductor laser module for use with a subcarrier multiplex optical transmission system according to an embodiment of the present invention.
Figure 7:
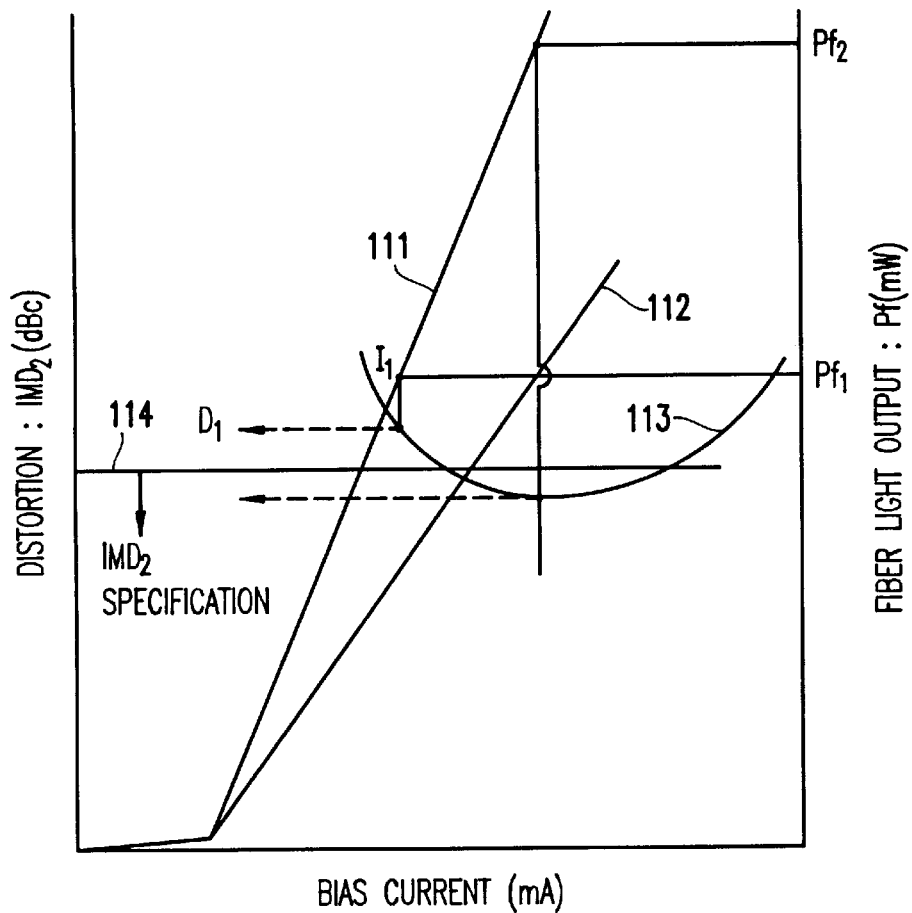
FIG. 7 is a characteristic diagram illustrating a principle of carrying out of a characteristic test for satisfying characteristics required by the system.

FIG. 6 shows a structure of a semiconductor laser module for use with a subcarrier multiplex optical transmission system according to an embodiment of this present invention. A semiconductor laser module 100 includes a semiconductor laser element 101, a lens 102 which converge the light from the semiconductor laser element 101, a pig tail optical fiber 103, and an optical isolator 104 interposed between the optical fiber 103 and the lens 102. A transition metal doped fiber 106 is connected to the pig tail optical fiber 103 by the connection part 105. In the semiconductor laser module of the present embodiment having the construction described above, outgoing light emitted from the semiconductor laser element 101 is converged by the lens 102 and optically coupled to the pig tail optical fiber 103. In other words, the lens 102 is an optical part which optically couples the semiconductor laser element 101 and the pig tail optical fiber 103 to each other. In the present embodiment, a distributed feedback type laser diode (DFB-LD) is used as the semiconductor laser element 101. The distributed feedback laser diode has high output power, low distortion and low noise characteristics. In order to prevent the deterioration of the characteristics by reflected returning light, the optical isolator 104 is built in the semiconductor laser module 100. The Semiconductor laser module 100 of the present embodiment satisfies the characteristics required by the system by adjusting the length of the transition metal doped fiber 106. FIG. 7 is a diagram illustrating a result when a characteristic test for detecting whether characteristics required by the system are satisfied is performed. In FIG. 7, two characteristics of first output characteristic 111 and second output characteristic 112 indicating relationships of the fiber light output to the bias current of the semiconductor laser and distortion characteristic (distortion/noise characteristic) 113 indicating the relationship of the distortion to the bias current of the semiconductor laser are illustrated. Referring to FIG. 7, at light output Pf1, value D1 of distortion characteristic 113 corresponding to a semiconductor laser bias current I1 is higher than upper limit value 114 of the IMD2 specification so it does not satisfy the IMD2 specification. However, light output Pf2 is higher than the lower limit value of the specified light output and distortion characteristic 113 is lower than upper limit value 114 of the IMD2 specification, so the IMD2 specification is satisfied. Where a light output condition in which the IMD2 specification is satisfied is present in this manner, transition metal doped fiber 106 of the length with which a loss corresponding to the difference (Pf2−Pf1) of two light output conditions Pf1, Pf2, is connected by the connecting element 105. For the connecting method of the connecting element 105, a fusion splice connection is employed popularly. However, some other connection which employs an optical connector or a mechanical splice which makes low reflection may be employed instead.

Figure 8:
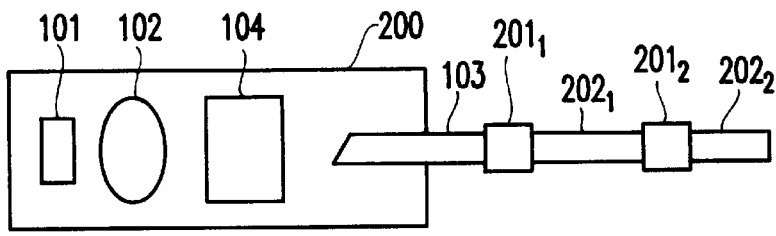
FIG. 8 is a schematic view showing a structure of a semiconductor laser module according to a modification of the present invention.

FIG. 8 shows a structure of a semiconductor laser module according to a modifying embodiment of the present invention. In a semiconductor laser module 200 of this embodiment, one end of first transition metal doped a fiber $202_1$ is connected to the optical fiber 103 by first connecting element $201_1$, and the other end of first transition metal doped fiber $202_1$ is connected to second transition metal doped fiber $202_2$ by second connecting element $201_2$. Since the other components of the semiconductor laser module 200 are same as those of the semiconductor laser module 100 shown in FIG. 6, overlapping description of them is omitted here.

In the semiconductor laser module 200 of the modifying embodiment, the attenuation amount is adjusted by the total length of two transition metal doped fibers $202_1$, $202_2$. First and second connecting elements $201_1$, $201_2$ may be any of, for example, a fusion splices, an optical connectors and a mechanical splices only if they give low reflection. Also it is effective to selectively use those the connecting elements $201_1$ and $201_2$ in accordance with a use. For example, where it is desired to vary the loss of the semiconductor laser module 200 readily in accordance with a use, an optical connector which can be exchanged readily should be used suitably as first connecting element $201_1$. To this end, an optical connector must be provided at one end of first transition metal doped fiber $202_1$. In this instance, it is suitable to use a fusion splice as second connecting element $201_2$. This is because, since the length of the transition metal doped fiber is adjusted by second connecting element $201_2$, it is required to assure a stable reflected light amount.

Next, two embodiments of a method of producing a semiconductor laser module of this invention will be a described below.

Figure 9:
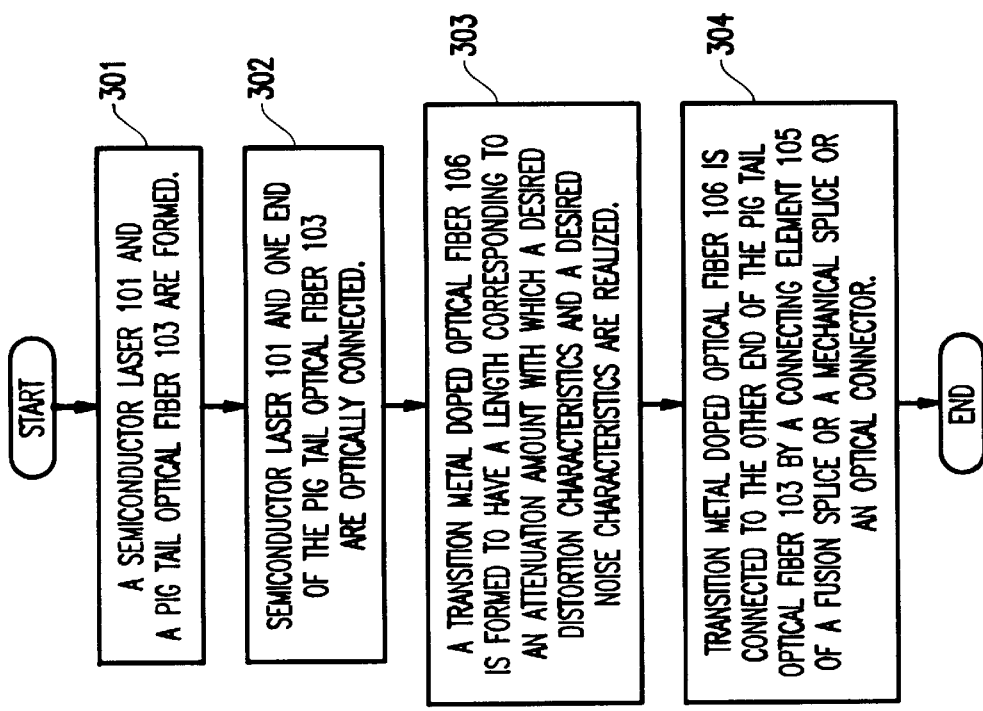
FIG. 9 is a flowchart of first embodiment of a method of producing a semiconductor module according to this invention.

Referring to FIG. 9, a first embodiment of a method of producing a semiconductor module according to this invent ion is described.

In Step 301, a semiconductor laser 101 and a pig tail optical fiber 103 are formed. In Step 302, semiconductor laser 101 and one end of the pig tail optical fiber 103 are optically connected. In Step 303, a transition metal doped optical fiber 106 is formed to have a length corresponding to an attenuation amount with which a desired distortion characteristics and a desired noise characteristics are realized. Finally, in Step 304, transition metal doped optical fiber 106 is connected to the other end of the pig tail optical fiber 103 by a connecting element 105 of a fusion splice or a mechanical splice or an optical connector.

Figure 10:
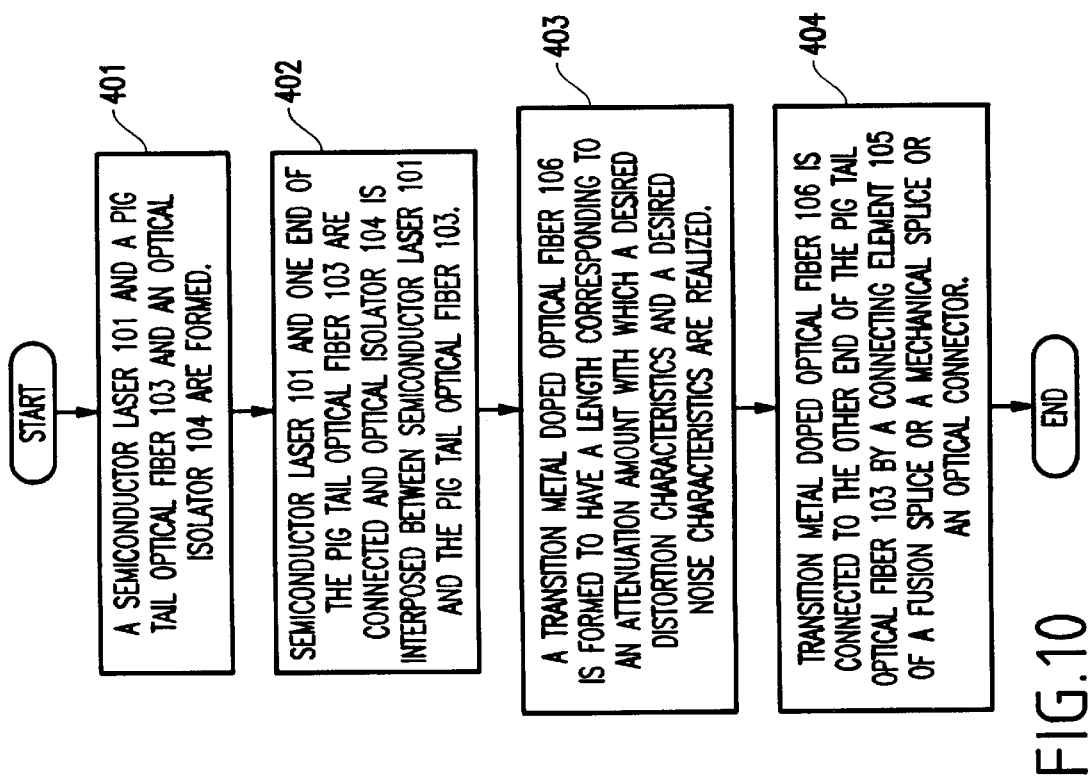
FIG. 10 is a flowchart of second embodiment of a method of producing a semiconductor module according to this invention.

Referring to FIG. 10, a second embodiment of a method of producing a semiconductor module according to this invention is described.

In Step 401, a semiconductor laser 101 and a pig tail optical fiber 103 and an optical isolator 104 are formed. In Step 402, semiconductor laser 101 and one end of the pig tail optical fiber 103 are optically connected and optical isolator 104 interposed between semiconductor laser 101 and pig tail optical fiber 103. In Step 403, a transition metal doped optical fiber 106 is formed to have a length corresponding to an attenuation amount with which a desired distortion characteristics and a desired noise characteristics are realized. Finally in Step 404, transition metal doped optical fiber 106 is connected to the other end of the pig tail optical fiber 103 by a connecting element 105 of a fusion splice or a mechanical splice or an optical connector.

Optical isolator 104 prevents light emitted from the semiconductor laser 101 from being introduced back into semiconductor laser 101 owing to reflection of the light.

By such a construction described above, it is possible to produce a semiconductor laser module having a distortion characteristic and a noise characteristic which both satisfy the specifications under a predetermined light output condition. Indeed the distortion characteristic and the noise characteristic of the semiconductor laser module of the present invention may not possibly satisfy the specifications under a predetermined light output condition, but the present invention is effective where there is a light output condition which is higher than a specified light output condition and in which both of the distortion characteristic and the noise characteristic satisfy the specifications.

While preferred embodiments of the present invention have been described using specific terms, such description is for illustrative purpose only, and it is to be understood that changes and variations may be made without departing from the spirit or scope of the following claims.

What is claimed is:

1. A semiconductor laser module, comprising:

a semiconductor laser;

a pig tail optical fiber;

a optical part for optically coupling said semiconductor laser and said pig tail optical fiber to each other; and a transition metal doped optical fiber formed in a length corresponding to an attenuation amount with which a desired distortion characteristics and a desired noise characteristics are realized and connected to the side of said pig tail optical fiber opposite to the side which faces said semiconductor laser.

2. A semiconductor laser module as claimed in claim 1, further comprising an optical isolator interposed between said semiconductor laser and said pig tail optical fiber for preventing light emitted from said semiconductor laser from being introduced back into said semiconductor laser as a result of reflection of the light.

3. A semiconductor laser module as claimed in claim 1, wherein said pig tail optical fiber and said transition metal doped optical fiber are connected to each other by a connecting element formed from a fusion splice.

4. A semiconductor laser module as claimed in claim 2, wherein said pig tail optical fiber and said transition metal doped optical fiber are connected to each other by a connecting element formed from a fusion splice.

5. A semiconductor laser module as claimed in claim 1, wherein said pig tail optical fiber and said transition metal doped optical fiber are connected to each other by a connecting element formed from a mechanical splice.

6. A semiconductor laser module as claimed in claim 2, wherein said pig tail optical fiber and said transition metal doped optical fiber are connected to each other by a connecting element formed from a mechanical splice.

7. A semiconductor laser module as claimed in claim 1, wherein said pig tail optical fiber and said transition metal doped optical fiber are connected to each other by a connecting element formed from an optical connector.

8. A semiconductor laser module as claimed in claim 2, wherein said pig tail optical fiber and said transition metal doped optical fiber are connected to each other by a connecting element formed from an optical connector.

9. A method of producing a semiconductor module, comprising the steps of:

forming a semiconductor laser and a pig tail optical fiber;

optically coupling the semiconductor laser and one end of the pig tail optical fiber;

forming a transition metal doped optical fiber having a length corresponding to an attenuation amount with which a desired distortion characteristics and a desired noise characteristics are realized; and connecting the transition metal doped optical fiber to the other end of the pig tail optical fiber.

10. A method of producing a semiconductor laser module as claimed in claim 9, further comprising the steps of:

forming an optical isolator for preventing light emitted from the semiconductor laser from being introduced back into the semiconductor laser as a result of reflection of the light; and interposing the optical isolator between the semiconductor laser and the pig tail optical fiber.

11. A method of producing a semiconductor laser module as claimed in claim 9, further comprising the step of connecting the pig tail optical fiber and the transition metal doped optical fiber to each other by a connecting element formed from a fusion splice.

12. A method of producing a semiconductor laser module as claimed in claim 10, further comprising the step of connecting the pig tail optical fiber and the transition metal doped optical fiber to each other by a connecting element formed from a fusion splice.

13. A method of producing a semiconductor laser module as claimed in claim 9, further comprising the step of connecting the pig tail optical fiber and the transition metal doped optical fiber to each other by a connecting element formed from a mechanical splice.

14. A method of producing a semiconductor laser module as claimed in claim 10, further comprising the step of connecting the pig tail optical fiber and the transition metal doped optical fiber to each other by a connecting element formed from a mechanical splice.

15. A method of producing a semiconductor laser module as claimed in claim 9, further comprising the step of connecting the pig tail optical fiber and the transition metal doped optical fiber to each other by a connecting element formed from an optical connector.

16. A method of producing a semiconductor laser module as claimed in claim 10, further comprising the step of connecting the pig tail optical fiber and the transition metal doped optical fiber to each other by a connecting element formed from an optical connector.

* * * * *